T. L. VALERIUS.
APPARATUS FOR SOAKING OR STERILIZING ICE CREAM CANS.
APPLICATION FILED JAN. 6, 1911.
1,094,499.
Patented Apr. 28, 1914.
2 SHEETS—SHEET 1.
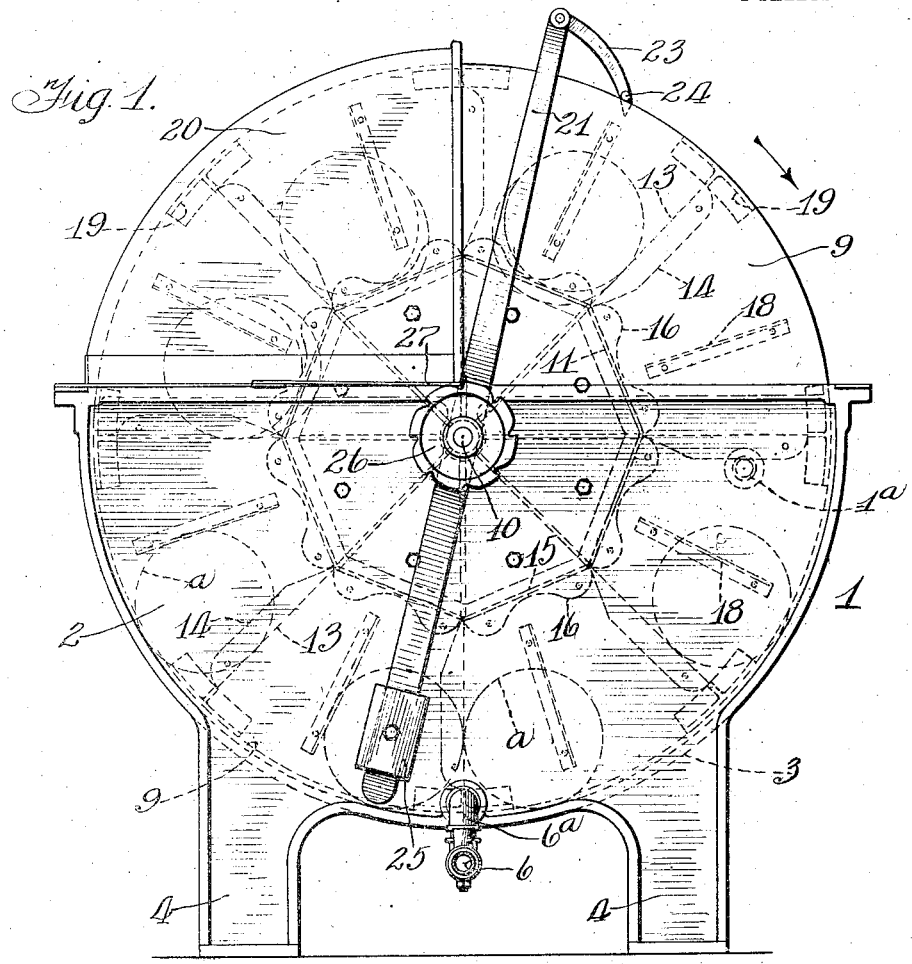
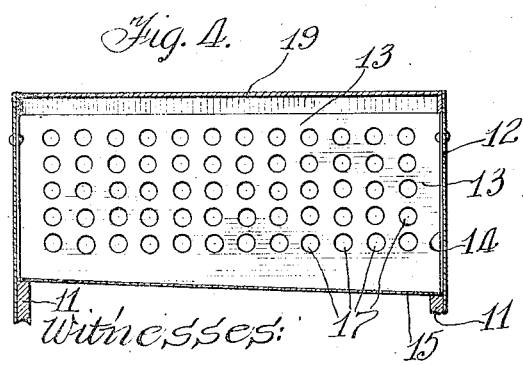
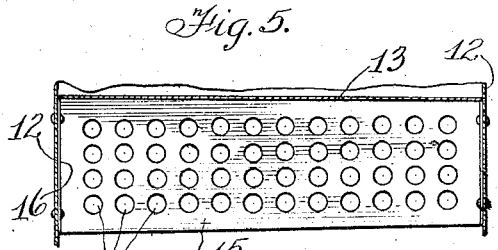
Witnesses:
J. C. Derick.
C. Paul Carker.
Inventor:
Theodore L. Valerius,
By Luther L. Miller
Atty.

T. L. VALERIUS.
APPARATUS FOR SOAKING OR STERILIZING ICE CREAM CANS.
APPLICATION FILED JAN. 6, 1911.
1,094,499.
Patented Apr. 28, 1914
2 SHEETS—SHEET 2.
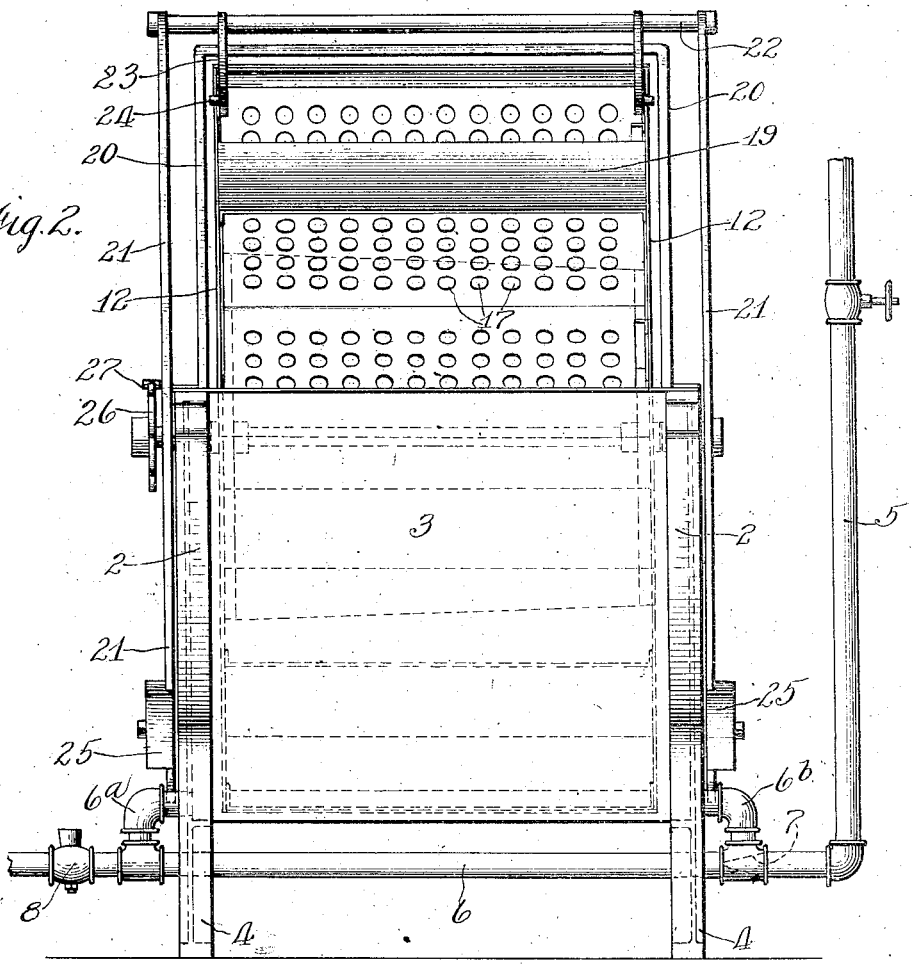
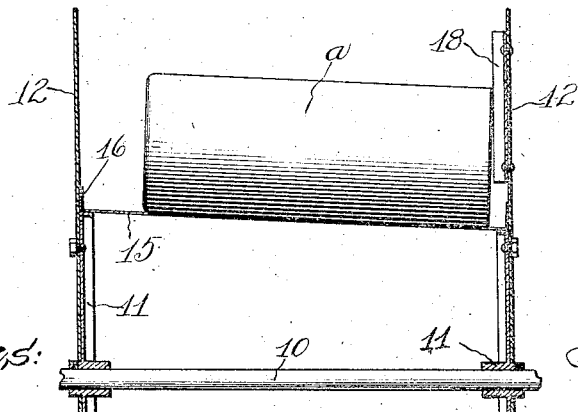
Witnesses:
J. C. Devrik.
C. Paul Parker.
Inventor:
Theodore L. Valerius,
By Luther L. Miller
Atty

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

APPARATUS FOR SOAKING OR STERILIZING ICE-CREAM CANS.

1,094,499.  Specification of Letters Patent.  Patented Apr. 28, 1914.

Application filed January 6, 1911. Serial No. 601,150.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Apparatus for Soaking or Sterilizing Ice-Cream Cans, or the like, of which the following is a specification.

This invention contemplates an apparatus which is especially well adapted for soaking or sterilizing ice cream packing cans, the object of the invention being to produce an apparatus of this character which is simple, durable and efficient in operation.

In the accompanying drawings, Figure 1 is a side elevation of an apparatus embodying the features of my invention. Fig. 2 is a front elevation thereof. Fig. 3 is a fragmental sectional view through the wheel for supporting and moving the cans. Figs. 4 and 5 are sectional detail views of said wheel.

The embodiment of my invention which I have herein shown comprises a semi-cylindrical tank 1, which may consist of two side castings 2 and an intermediate wall 3 of sheet metal forming the bottom, front and rear walls of the tank. The castings 2 may have supporting legs 4 thereon.

The tank 1 is adapted to contain a quantity of water, which may be heated in any suitable manner. The means herein shown for heating the water in the tank comprises a steam supply pipe 5, a pipe 6 connected to the steam pipe 5 and extending beneath the tank 1, and branch pipes $6^a$ $6^b$ connecting the ends of the pipe 6 with the lower part of the tank. Within the pipe 5 adjacent to its discharge end may be fixed a muffler or injector 7. It will be seen that the tank 1, and the pipes 6 $6^a$ $6^b$ afford a continuous or endless path through which the water may be caused by the inflowing steam to circulate, so that the water in the tank 1 will be maintained at a high temperature.

$1^a$ is an outlet for overflow from the tank 1.

8 is a drain cock.

Within the tank 1 is rotatably mounted a structure in the form of a wheel 9 having a plurality of compartments, each of which is adapted to receive a can *a* to be soaked or sterilized. The wheel 9 comprises a central shaft 10 rotatably mounted in suitable bearings in the side castings 2, said shaft having fixed thereon two side flanges 11 of polygonal outline lying adjacent the side walls 2 of the tank. To the flanges 11 are fixed two disks 12 concentric with the shaft 10, said flanges and disks forming the sides of the wheel 9. As will be seen from inspection of Fig. 1 the diameter of the wheel 9 is substantially equal to the interior diameter of the tank 1.

The compartments hereinbefore referred to for receiving the cans to be washed may be formed by radial side walls 13 extending between the disks 12 and having flanges 14 secured to said disks. The bottoms of said compartments consist of plates 15 resting upon the edges of the side flanges 11, said plates having flanges 16 at their ends which are secured to the disks 12. The walls 13 and 15 have perforations 17 therein to permit the water in the tank to pass freely through said walls in the rotation of the wheel 9. In order that the cans may drain properly when they are carried out of the water, the bottom walls 15 of the pockets are made sloping as shown in Fig. 3. To this end one of the side flanges 11 may be made of less diameter than the other. Stops 18 secured to the disk 12 adjacent the lower ends of the walls 15 serve to space the open ends of the cans *a* from said disk so as to permit free drainage from the cans.

At the outer edges of the side walls 13 of the pockets are cross braces 19 extending from one disk 12 to the other and having their ends secured to said disks, said braces extending in opposite directions from the outer edge of each side wall 13. These cross braces insure that the cans shall not roll out of the pockets as the pockets enter and leave the horizontal plane of the axis of the wheel 9.

A hood 20 may be provided to fit about the upper portion of the wheel 9 and cover one-half of the tank 1.

The means provided in the present instance for rotating the wheel 9 comprises a lever 21 pivoted upon each end of the shaft 10, said levers being connected at their upper ends by a cross-bar 22 forming a handle. Upon said cross-bar are pivoted two dogs 23 each having a stud 24 running on the periphery of one of the disks 12, the ends of said dogs being adapted to engage the edges of the cross-braces 19 to rotate the wheel 9 when the levers 21 are swung forwardly.

If desired, a weight 25 may be placed upon the lower end of each of the levers 21, as herein shown, so as to automatically return said levers to an approximately vertical position after the wheel 9 has been given a partial rotation.

Rotation of the wheel 9 in a backward direction may be prevented by suitable means, such as a toothed wheel 26 fixed upon one end of the shaft 10 and a spring dog 27 fixed to the tank 1 and adapted to engage said toothed wheel.

In the use of the apparatus, when it is desired to soak the cans before placing them in a washing machine, a suitable quantity of water is placed in the tank 1 and washing powder placed therein to form a soaking solution of the desired strength. The water is preferably maintained at a lukewarm temperature. The operator places a can in one of the pockets at the forward side of the machine, and then gives the wheel 9 a partial rotation by means of the levers to bring the next succeeding pocket into position to receive a can.

When the apparatus is to be used for sterilizing cans after they have been washed, a quantity of clean water is placed in the tank 1 and is brought to a high temperature by means of the steam flowing through the pipe 5. The cans are then placed in the wheel 9 and the wheel rotated as before to carry them through the water in the tank 1.

It has been found in practice that owing to the high temperature imparted to the cans in the water, the cans quickly dry after leaving the water at the left hand side of the tank (Fig. 1), so that when they reach the point of removal they are dry. The sloping position of the bottom walls 15 permits all water to drain from the interior of the cans, and the stops 18 hold the open ends of the cans away from the adjacent disks 12 a sufficient distance for this purpose.

While I have herein described my invention in considerable detail, I do not limit myself to the exact construction shown, because many modifications within the scope of the invention will occur to those skilled in this art.

I claim as my invention:

1. In an apparatus of the character described, the combination of a semicylindrical tank and a wheel-like structure rotatably mounted in said tank, said structure comprising two parallel sides extending close to the curved sides and bottom of the tank, bottom plates extending between the sides of said wheel-like structure, the ends of said plates being secured to one of the sides of said structure closer to the axis thereof than the opposite end of said plates, and walls extending between the sides of said structure, said walls and bottom plates forming a series of separate compartments extending longitudinally of the axis of the wheel-like structure, each adapted to receive an ice cream packing can with its open end adjacent to the end of said bottom plates nearest to the center of said structure, the outer sides of said compartments being open whereby the cans roll in contact with the curved sides and bottom of the tank.

2. In an apparatus of the character described, the combination of a semicylindrical tank and a wheel-like structure rotatably mounted in said tank, said structure comprising two parallel sides extending close to the curved sides and bottom of the tank, bottom plates extending between the sides of said wheel-like structure, the ends of said plates being secured to one of the sides of said structure closer to tne axis thereof than the opposite end of said plates, walls extending between the sides of said structure, said walls and bottom plates forming a series of separate compartments extending longitudinally of the axis of the wheel-like structure, each adapted to receive an ice cream packing can with its open end adjacent to the end of said bottom plates nearest to the center of said structure, the outer sides of said compartments being open whereby the cans roll in contact with the curved sides and bottom of the tank, and cross-pieces on the wheel-like structure adjacent the open sides of the compartments to prevent cans from rolling out of the compartments as the latter enter and leave the horizontal plane of the axis of said structure.

3. In an apparatus of the character described, the combination of a tank, a wheel-like structure rotatably mounted in said tank, said structure comprising a shaft journaled in the side walls of the tank, a pair of disks fixed on said shaft, radial walls extending between said disks and forming container-receiving compartments, braces extending between said disks at the outer edge of said radial walls, a pair of levers pivoted on the ends of said shaft, a crossbar connecting the outer ends of said levers, and dogs mounted on said crossbar, said dogs each having a portion adapted to travel upon the periphery of one of said disks, said dogs being adapted to engage said braces for rotating said wheel-like structure.

In testimony whereof I affix my signature in presence of two witnesses.

THEODORE L. VALERIUS.

Witnesses:
A. O. TONNE,
F. P. LONSDALE.